United States Patent [19]

Ichikawa et al.

[11] Patent Number: 5,104,785
[45] Date of Patent: * Apr. 14, 1992

[54] PROCESS OF FORMING SILVER HALIDE GRAINS

[75] Inventors: Yasunori Ichikawa; Hiroshi Ohnishi; Shigeharu Urabe; Akira Katoh, all of Kanagawa, Japan

[73] Assignee: Fuji Photo Film Co., Ltd., Kanagawa, Japan

[*] Notice: The portion of the term of this patent subsequent to Nov. 7, 2006 has been disclaimed.

[21] Appl. No.: 452,651

[22] Filed: Dec. 19, 1989

[30] Foreign Application Priority Data

Dec. 19, 1988 [JP] Japan .................. 63-318380

[51] Int. Cl.$^5$ .............................................. G03C 1/015
[52] U.S. Cl. ........................................ 430/569; 430/567
[58] Field of Search .................................... 430/569

[56] References Cited

U.S. PATENT DOCUMENTS 3,031,304 4/1962 Oliver .................. 430/569
4,879,208 11/1989 Urabe .................. 430/569

FOREIGN PATENT DOCUMENTS 1243356 8/1971 United Kingdom ........ 430/569

OTHER PUBLICATIONS

Chemical Abstracts, vol. 108, No. 12: Mar. 21, 1988, p. 163 (Ref. No. 97240N).

Primary Examiner—Marion E. McCamish
Assistant Examiner—Janis L. Dote
Attorney, Agent, or Firm—Sughrue, Mion, Zinn, Macpeak & Seas

[57] ABSTRACT

A process of forming silver halide grains which comprises disposing a mixer outside of a reaction vessel for causing the nucleus formation and crystal growth of silver halide grains. The process further includes the steps of: supplying an aqueous solution of a water-soluble silver salt, an aqueous solution of a water-soluble halide, and an aqueous protective colloid solution into the mixer to form fine, silver halide grains therein; immediately supplying the fine grains into the reaction vessel; and performing the nucleus formation and crystal growth of the silver halide grains in the reaction vessel. The formation of the fine grains is controlled by controlling the flow rates of the solutions being supplied to the mixer and the r.p.m. of a stirrer provided in the mixer.

2 Claims, 1 Drawing Sheet

PROCESS OF FORMING SILVER HALIDE GRAINS

FIELD OF THE INVENTION

This invention relates to a process of forming silver halide grains and, more particularly, to a process of forming silver halide grains having a completely homogeneous halide composition in the silver halide crystals and having no halide variation among the silver halide grains.

BACKGROUND OF THE INVENTION

The formation of silver halide grains is composed of two main steps, that is, a nucleus formation and a crystal growth. In T. H. James, *The Theory of the Photographic Process*, 4th edition (published by Macmillan Co., 1977), it is disclosed that, "Although crystallization is often considered to consist of two major processes, nucleation and growth, two additional processes occur inder sone conditions of photographic emulsion precipitation, Ostwald ripening and recrystallization."

Nucleating is the process in which there is a population explosion of the number of crystals when entirely new crystals are created. Growth is the addition of new layers to crystals that are already present. ostwald ripening occurs predominantly at higher temperature, in the presence of solvents, and when there is a wide distribution of grain sizes. Recrystallization is the process in which the composition of crystals changes. That is, since in the formation of silver halide grains, nuclei are formed at the beginning and the subsequent crystal growth mainly occurs on the existing nuclei only, the number of the silver halide grains does not increase during the growth of the silver halide grains.

Silver halide grains are generally produced by reacting an aqueous silver salt solution and an aqueous halide solution in an aqueous colloid solution contained in a reaction vessel. In this case, there is known a single jet process of placing an aqueous solution of a protective colloid, such as gelatin, and an aqueous halide solution in a reaction vessel and adding thereto an aqueous silver salt solution along with stirring for a certain time. Also known is a double jet process of placing an aqueous gelatin solution in a reaction vessel and simultaneously adding an aqueous halide solution and an aqueous silver salt solution each for a certain time. Upon comparing both of the processes with each other, in the double jet process, silver halide grains having a narrower grain size variation are obtained and, further, the halide composition can be desirably changed with the growth of the grains.

Also, it is known that the nucleus formation of silver halide grains is greatly changed by the concentration of silver ions (or halogen ions) in the reaction solutions, the concentration of a silver halide solvent, the supersaturation, the temperature, etc. In particular, the heterogeneity of a silver ion concentration or a halogen ion concentration caused by an aqueous silver salt solution and an aqueous halide solution added to a reaction vessel causes the variation of supersaturation and solubility in the reaction vessel by each concentration, thereby the nucleus formation rate differs to cause a heterogeneity in the silver halide crystal nuclei formed.

In order to avoid the occurrence of the heterogeneity described above, it is necessary to quickly and uniformly mix the aqueous silver salt solution and the aqueous halide solution being supplied to the aqueous colloid solution for homogenizing the silver ion concentration or the halogen ion concentration in the reaction vessel.

In a conventional process of adding an aqueous halide solution and an aqueous silver salt solution to the surface of an aqueous colloid solution in a reaction vessel, the portions having a high halogen ion concentration and a high silver ion concentration occur near the addition locations of the aqueous solutions, which makes it difficult to produce homogeneous silver halide grains. For improving the local deviation of the concentrations, there are known the techniques disclosed in U.S. Pat. Nos. 3,415,650 and 3,692,283 and British Patent No. 1,323,464.

In these processes, a hollow rotary mixer (filled with an aqueous colloid solution and being, preferably partitioned into upper and lower chambers by a disk-form plate) having slits in the cylindrical walls thereof, is disposed in a reaction vessel filled with an aqueous colloid solution in such a manner that the rotary axis is placed in the direction of gravity. Further, an aqueous halide solution and an aqueous silver salt solution are supplied into the mixer, which is rotating at a high speed, through conduits from the upper and lower open ends and mixed quickly to react the solutions (i.e., when the mixer is partitioned into the upper and lower chambers by a partition disk, the aqueous halide solution and the aqueous silver salt solution supplied to the upper and lower chambers, respectively, are diluted with the aqueous colloid solution filled in both the chambers and then quickly mixed near the outlet slit of the mixer to cause the reaction). The silver halide grains thus formed are discharged into the aqueous colloid solution in the reaction vessel by the centrifugal force caused by the rotation of the mixer to form silver halide grains.

On the other hand, JP-B-55-10545 (the term "JP-B" as used herein means an "examined published Japanese patent application") discloses a technique of improving the local deviation of the concentrations to prevent the occurrence of the heterogeneous growth of silver halide grains. The process is a technique of separately supplying an aqueous halide solution and an aqueous silver salt solution into a mixer filled with an aqueous colloid solution from the lower open end, the mixer being placed in a reaction vessel filled with an aqueous colloid solution, abruptly stirring and mixing the reaction solutions with a lower stirring blade (turbine propeller) provided in the mixer to grow silver halide grains, and immediately discharging the silver halide grains thus grown into the aqueous colloid solution in the reaction vessel from an upper opening of the mixer by means of an upper mixing blade provided in the upper portion of the aforesaid mixer.

Also, JP-A-57-92523 (the term "JP-A" as used herein means an "unexamined published Japanese patent application") discloses a production process of silver halide grains for similarly preventing the occurrence of local heterogeneity of the concentrations. That is, there is disclosed a process of separately supplying an aqueous halide solution and an aqueous silver salt solution into a mixer filled with an aqueous colloid solution from a lower open end, the mixer being disposed in a reaction vessel filled with an aqueous colloid solution. The process further includes diluting both the reaction solutions with the aqueous colloid solution, abruptly stirring and mixing the reaction solutions by a lower stirring blade member provided in the mixer, and immediately discharging the silver halide grains thus grown into the aqueous colloid solution in the reaction vessel from an upper opening of the mixer. As a result, both the reaction solutions, diluted with the aqueous colloid solution as described above, are passed through a gap formed between the inside wall of the aforesaid mixer and the end of a blade of the aforesaid stirring blade member, without passing through gaps between the individual blades of the stirring blade member, so as to abruptly mix the reaction solutions due to the shearing effect in the aforesaid gap and thus cause the reaction to thereby grow silver halide grains.

However, although in the aforesaid processes, the occurrence of the local heterogeneity of the concentrations of silver ions and halogen ions in the reaction vessel can be surely prevented to a considerable extent, the heterogeneity of the concentrations still exist in the mixer and, in particular, a considerably large variation of the concentrations exists near the nozzles for supplying the aqueous silver salt solution and the aqueous halide solution, and near the lower portion and the stirring portion of the stirring blade member. Furthermore, the silver halide grains supplied to the mixer together with the protective colloid are passed through the portions having such a heterogeneous distribution of the concentrations and, more importantly, are rapidly grown in these portions. In other words, in these processes, the variation of the concentrations exists in the mixer and since the grain growth rapidly occurs in the mixer, the purpose of performing a homogeneous nucleus formation and a homogeneous grain growth of silver halide grains in a state having no variation of the concentrations has not been attained.

Furthermore, various attempts have been made for solving the problem of the heterogeneous distribution of the silver ion concentration and the halogen ion concentration by more complete mixing wherein a reaction vessel and a mixer are separately disposed and an aqueous silver salt solution and an aqueous halide solution are supplied to the mixer and abruptly mixed therein to form silver halide grains.

For example, U.S. Pat. No. 4,171,224 and JP-B-48-21045 disclose a process and an apparatus for circulating an aqueous colloid solution (containing silver halide grains) in a reaction vessel at the bottom of the reaction vessel by means of a pump, disposing a mixer in the circulating route, supplying an aqueous silver salt solution and an aqueous halide solution to the mixer, and abruptly mixing both the aqueous solutions in the mixer to form silver halide grains.

Also, U.S. Pat. No. 3,897,935 discloses a process of circulating an aqueous protective colloid solution (including silver halide grains) in a reaction vessel at the bottom of the reaction vessel by means of a pump and injecting an aqueous halide solution and an aqueous silver salt solution into the circulation system.

Furthermore, JP-A-53-47397 discloses a process an and apparatus for circulating an aqueous colloid solution (containing silver halide emulsion) in a reaction vessel by means of a pump, including first adding an aqueous alkali metal halide solution into the circulation system, and after diffusing the solution until the mixture becomes uniform, adding an aqueous silver salt solution into the system followed by a mixing step to form silver halide grains.

However, in these processes, while the flow rate of the aqueous solution being circulated in the reaction vessel and the stirring efficiency of the mixer can be separately changed, and the grain formation can be performed under a condition of a more homogeneous distribution of the concentrations, eventually, the silver halide crystals sent from the reaction vessel together with the aqueous colloid solution cause an abrupt grain growth at the inlets of the aqueous silver salt solution and the aqueous halide solution. Accordingly, it is practically impossible to prevent the formation of the variation of the concentrations at the mixing portion or near the inlets as in the case described above, and thus, the purpose of homogeneously forming silver halide grains in a state having no variation of the concentrations has not been attained.

SUMMARY OF THE INVENTION

The object of this invention is to solve the problem of the nucleus formation and crystal growth of silver halide grains in a heterogeneous field of the concentrations (silver ion and halogen ion concentrations) in the aforesaid conventional techniques and the formation, thereby, of heterogeneous silver halide grains (grain sizes, crystal habit, the halogen variation among and in the silver halide grains, and the reduced nucleus variation among and in the silver halide grains).

The inventors previously proposed a process of disposing a mixer outside of a reaction vessel for causing the nucleus formation and crystal growth of silver halide grains including the steps of forming silver halide grains, supplying an aqueous solution of a water-soluble silver salt and an aqueous solution of water-soluble silver halide(s) into the mixer and mixing them to form silver halide, fine grains, immediately supplying the fine grains into the reaction vessel containing an aqueous protective colloid solution, and forming silver halide grains in the reaction vessel (Japanese Patent Application 63-195778). Further, a process of causing the crystal growth of silver halide grains in the same manner as above was proposed (Japanese Patent Application 63-7851) for achieving the aforesaid object. The present invention relates to a further improvement of these inventions.

That is, it has now been discovered that the aforesaid object can be achieved by the present invention as set forth hereinbelow.

According to this invention, there is provided a process of forming silver halide grains, which comprises disposing a mixer outside of a reaction vessel for causing the nucleus formation and crystal growth of silver halide grains. The process further includes the steps of: supplying an aqueous solution of a water-soluble silver salt, an aqueous solution of water-soluble halide(s), and an aqueous protective colloid solution into the mixer to form silver halide, fine grains in the mixer, immediately supplying the fine grains into the reaction vessel, and performing the nucleus formation and the crystal growth of the silver halide grains in the reaction vessel. The formation of the fine grains is controlled by controlling the flow rates of the solutions being supplied to the mixer and the rotational speed of a stirrer provided in the mixer.

DETAILED DESCRIPTION OF THE INVENTION

The term "nuclei", in this invention, means newly forming silver halide grains during the formation of a silver halide emulsion and in a stage of deviating the number of the silver halide crystals, and such silver halide grains which are in a stage of causing only the growth of nuclei, without changing the number of silver halide crystals, are referred to as grains causing the growth only.

In the step of the nucleus formation, the generation of new nuclei, the dissolution of already existing nuclei, and also the growth of nuclei occur simultaneously.

In the practice of the nucleus formation in this invention, it is important that during the formation of nuclei, the formation of silver halide by the addition of an aqueous silver salt solution and an aqueous halide solution is not performed in the reaction vessel and further that the aqueous protective colloid solution (containing silver halide grains) in the reaction vessel is not circulated into the mixer. Thus, the process of this invention is completely different from conventional processes and is a novel process for obtaining homogeneous silver halide grains.

Figure 1:
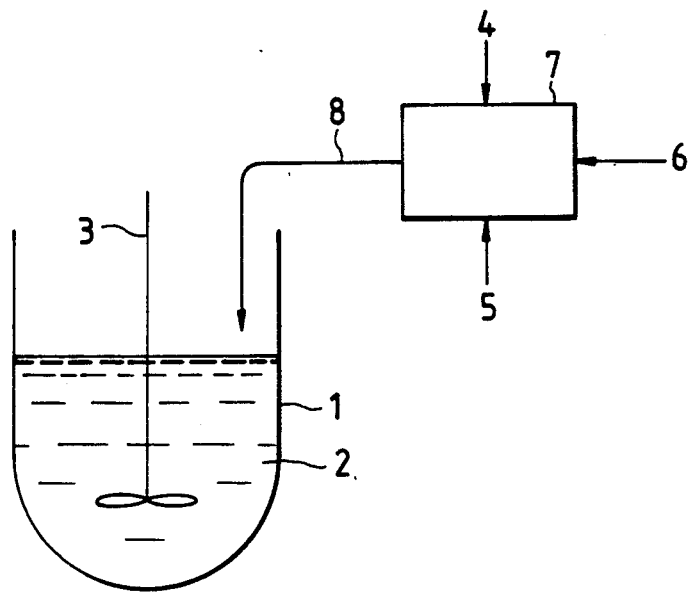
FIG. 1 is a schematic view showing the system for the process of this invention.

FIG. 1 shows a system for the nucleus formation and crystal growth process of this invention.

In FIG. 1, a reaction vessel 1 contains an aqueous protective colloid solution 2 and the aqueous protective colloid solution is stirred by a propeller 3 disposed on a rotary shaft. An aqueous silver salt solution, an aqueous halide solution, and an aqueous protective colloid solution are introduced into a mixer 7, disposed outside the reaction vessel, through the addition systems or conduits 4, 5, and 6, respectively. In this case, if necessary, a part of the aqueous protective colloid solution may be added together with the aqueous halide solution and/or the aqueous silver salt solution. After quickly and strongly mixing the solutions in the mixer 7, the mixture is immediately introduced into the reaction vessel 1 through a system or conduit 8.

Figure 2:
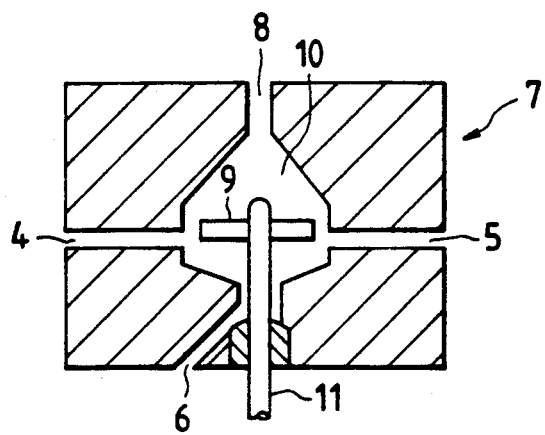
FIG. 2 is a cross sectional view showing the detail of the mixer for use in this invention.

FIG. 2 shows in detail the mixer 7. The mixer 7 has a reaction chamber 10 in the inside thereof and a rotary shaft 11 having a stirring blade 9 disposed on the end thereof so as to be positioned in the reaction chamber 10. An aqueous silver salt solution, an aqueous halide solution, and an aqueous protective colloid solution are added to the reaction chamber 10 from three inlet conduits 4, 5 and 6 (the inlet conduit 6 is omitted from the Figure). By rotating the rotary shaft at a high speed (higher than 1,000 r.p.m., preferably higher than 2,000 r.p.m., and more preferably higher than 3,000 r.p.m.), the solution containing very fine silver halide grains formed by the quick and strong stirring is immediately introduced into the reaction vessel through the conduit 8. The very fine grains formed in the mixer and introduced into the reaction vessel 1 are easily dissolved into silver ions and halogen ions again owing to the fineness of the grain sizes to cause a homogeneous nucleus formation and crystal growth.

The halide composition of the very fine silver halide grains is selected to be same as the halide composition of the desired silver halide grains. The fine grains introduced into the reaction vessel 1 are dispersed in the reaction vessel and halogen ions and silver ions of the desired halide composition are released from each fine grain. The size of the grains formed in the mixer 7 is very fine, the number of the grains is very large, and since the silver ions and halogen ions (in the case of growing mixed crystals, the composition of the halogen ions is same as the desired halogen ion composition) are released from such a large number of grains and the release thereof occurs throughout the entire protective colloid in the reaction vessel, the result is completely homogeneous nucleus formation and crystal growth.

In this case, it is important that the silver ions and the halogen ions are not added to the reaction vessel 1 as aqueous solutions, and that the aqueous protective colloid solution in the reaction vessel 1 is not circulated into the mixer.

With respect to the aforesaid point, the process of this invention is completely different from conventional processes and can have an astonishing effect on the nucleus formation and the crystal growth of silver halide grains.

The fine grains formed in the mixer have a very high solubility since the grain sizes thereof are very fine and easily dissolved into silver ions and halogen ions again when they are added to the reaction vessel. Hence, the ions are deposited on a very slight part of the fine grains thus introduced into the reaction vessel to form silver halide nuclei and to accelerate the crystal growth, but the fine grains together cause so-called Ostwald ripening due to the high solubility to increase the grain sizes.

In this case, if the sizes of the fine grains being introduced into the reaction vessel are increased, the solubility thereof is reduced to delay the dissolution thereof in the reaction vessel and to greatly reduce the nucleus formation rate. In some cases, the grains can no longer be dissolved, thereby an effective nucleus formation cannot be performed and, on the contrary, the grains themselves become nuclei to cause grain growth.

In this invention, the problem is solved by the following three techniques.

(1) After forming fine grains in the mixer, the grains are immediately added to the reaction vessel.

As will be described below, it is known that fine grains are previously formed to provide a fine grain silver halide emulsion, thereafter, the emulsion is re-dissolved, and the dissolved fine grain emulsion is added to a reaction vessel containing silver halide grains becoming nuclei and a silver halide solvent to cause the grain formation. However, in such a process, the very fine grains once formed cause Ostwald ripening in the step of grain formation, the step of washing, the step of re-dispersion, and the step of re-dissolution to increase the grain size.

In this invention, the occurrence of Ostwald ripening is prevented by disposing a mixer at a position very near the reaction vessel and shortening the residence time of the added solution in the mixer, that is, by immediately adding the fine grains formed in the mixer to the reaction vessel. Practically, the residence time t of the solution added to the mixer is shown by the following equation:

$$t = \frac{v}{a + b + c}$$

v: Volume (ml) of the reaction chamber of the mixer.

a: Addition amount (ml/min.) of an aqueous silver nitrate solution.

b: Addition amount (ml/min.) of an aqueous halide solution.

c: Addition amount (ml/min.) of an aqueous protective colloid solution.

In the production process of this invention, the residence time t is not longer than 10 minutes, preferably not longer than 5 minutes, more preferably not longer than 1 minute, and particularly preferably not longer than 20 seconds. The fine grains thus obtained in the mixer are immediately added to the reaction vessel without increasing the grain size.

For controlling the residence time, it is necessary to control the flow rates of the solutions being added to the mixer.

One of the features of this invention concerns this aspect, that is, the aspect of controlling the flow rate of the sum of the aforementioned addition amounts a, b, and c while keeping the ratios of each solution to the other at a constant value.

(2) The solutions are stirred strongly and with a good efficiency in the mixer.

In T. H. James, *The Theory of the Photographic Process,* page 93, he discloses that "Another type of grain growth that can occur is coalescence. In coalescence ripening, an abrupt change in size occurs when pairs or larger aggregates of crystals are formed by direct contant and welding together of crystals that were widely separated. Both Ostwald and coalescence ripening may occur during precipitation, as well as after precipitation has stopped."

The coalescence ripening described above is liable to occur when the grain sizes are very small and is particularly liable to occur when stirring is insufficient. In the extreme case, the silver halide grains sometimes form coarse, massive grains. On the other hand, since in this invention, a closed type mixer as shown in FIG. 2 is used, the stirring blade in the reaction chamber can be rotated at a high rotational speed, that is, the solutions in the mixer can be strongly and efficiently stirred and nixed. High speed stirring cannot be practiced in the conventional open type reaction vessel since, in the open type vessel, when a stirring blade is rotated at a high rotational speed, the liquid in the vessel is scattered away and also foam is formed by centrifugal force, which makes it practically impossible to use such a system. In the present invention, the occurrence of the aforesaid coalescence ripening can be prevented and very fine silver halide grains are obtained.

In this invention, the rotation number of the stirring blade is at least 1,000 r.p.m., preferably at least 2,000 r.p.m., and more preferably at least 3,000 r.p.m.

As a means for controlling the rotational speed of the stirring blade of the mixer, which is a second feature of this invention, any means can be used if the desired condition is obtained.

(3) Injection of an aqueous protective colloid solution into the mixer.

The occurrence of the aforesaid coalescence ripening can be remarkably prevented by a protective colloid for the silver halide, fine grains. In this invention, the aqueous protective colloid solution is added to the mixer by the following method.

(a) The aqueous protective colloid solution is separately added to the mixer.

The concentration of the protective colloid is at least 0.2% by weight, and preferably at least 0.5% by weight and the flow rate of the aqueous protective colloid solution is at least 20%, preferably at least 50%, and more preferably at least 100% of the sum of the flow rate of the aqueous silver nitrate solution and the flow rate of the aqueous halide solution being added to the mixer. In the present invention, this method is employed.

(b) The protective colloid is contained in the aqueous halide solution being added to the mixer.

The concentration of the protective colloid is at least 0.2% by weight, and preferably at least 0.5% by weight.

(c) The protective colloid is contained in the aqueous silver nitrate solution being added to the mixer.

The concentration of the protective colloid is at least 0.2% by weight, and preferably at least 0.5% by weight. When gelatin is used as the protective colloid, since gelatin silver may be formed from silver ions and gelatin if the mixture is stored for a long time and silver colloid may be formed by the photodecomposition and/or the thermal decomposition thereof, it is preferred to mix the aqueous silver salt solution and the aqueous gelatin solution directly before use.

Also, as to the aforesaid method (a), (b), and (c), the method (a) may be used singly, a combination of the method (a) and (b) or the method (a) and (c), or a combination of the method (a), (b), and (c) may be used.

In this invention, gelatin is usually used as the protective colloid but other hydrophilic colloids can also be used. Practically, the hydrophilic colloids which can be used in this invention are described in *Research Disclosure,* Vol. 176, No. 17643, Paragraph IX (December, 1978).

The grain sizes obtained by the aforesaid techniques (1) to (3) can be confirmed by a transmission type electron microscope on a mesh and in this case, the magnification is from 20,000 to 40,000 magnifications.

The sizes of the fine grains obtained by the process of this invention are not larger than 0.06 μm, preferably not larger than 0.03 μm, and more preferably not larger than 0.01 μm.

U.S. Pat. Nos. 2,146,938 and 4,379,837 describe that a crystal growth is performed by adding a fine grain silver halide emulsion to a silver halide emulsion being grown, but they all use previously prepared fine grain silver halide emulsion and also relate to the step of the crystal growth, and hence these techniques are completely different from the process of the present invention.

T. H. James, *The Theory of the Photographic Process,* 4th edition cites a Lippmann emulsion as a fine grain silver halide emulsion and describes that the mean grain size is 0.05 μm. It is possible to obtain fine silver halide grains having a mean grain size of not larger than 0.05 μm, but even if such fine grains are obtained, the grains are unstable and the grain sizes are easily increased by Ostwald ripening.

When an adsorptive material is adsorbed onto fine grains as in the process of U.S. Pat. No. 4,379,837, the occurrence of Ostwald ripening may be prevented to some extent, but the dissolving speed of the fine grains is reduced by the presence of the adsorptive material, which is contrary to the intention of this invention.

In U.S. Pat. No. 4,457,101, it is disclosed that "silver, a bromide, and an iodide can be introduced at the beginning or in the growing stage as a form of fine silver halide grains dispersed in a dispersion medium. That is, silver bromide grains, silver iodide grains and/or silver iodobromide grains can be introduced."

However, the above description is only a general description of using a fine grain emulsion for the formation of silver halide and does not show the process and the system disclosed by the present invention.

In the conventional processes described above, since a fine grain silver halide emulsion is previously prepared and the emulsion is re-dissolved, silver halide grains having fine grain sizes cannot be obtained. Accordingly, these grains having relatively large grain sizes cannot be quickly dissolved in a reaction vessel, a very long period of time is required for completing the dissolution thereof, or it is required to use a large amount of a silver halide solvent. In such a circumstance, the nucleus formation is performed at a very supersaturation for the grains being grown in a vessel, which results in greatly broadening the grain size variation of the nuclei and thus causing the reduction of properties such as the broadening of the size variation of silver halide grains formed, the reduction of the photographic gradation, the reduction of sensitivity by the heterogeneous chemical sensitization (it is impossible to most suitably, chemically sensitize silver halide grains having large grain sizes and silver halide grains having small grain sizes simultaneously), the increase of fog, the deterioration of graininess, etc.

Furthermore, in the conventional processes, there are many steps of grain formation, washing, dispersion, cooling, storage, and re-dispersion, thereby the production costs become high, and also there are many restrictions on the addition system of an emulsion as compared with the addition system for other solutions.

These problems are solved by the process of this invention. That is, since very fine grains are introduced into the reaction vessel by the process of this invention, the solubility of the fine grains is higher, thereby the dissolution rate is high and the grains being grown in the reaction vessel result in nucleus formation and crystal growth under a high supersaturation condition. Therefore, the size distributions of the nuclei and the grains formed are not broadened. Furthermore, since fine grains formed in the mixer are added to the reaction vessel as disclosed, there is no problem with the production cost.

When a silver halide solvent is used in the reaction vessel in the process of this invention, a far higher dissolution rate of fine grains and a far higher nucleus formation rate and crystal growing rate of grains in the reaction vessel are obtained.

As a silver halide solvent, there are a water-soluble bromide, a water-soluble chloride, a thiocyanate, ammonia, thiether, a thiourea, etc.

For example, there are thiocyanates (described in U.S. Pat. Nos. 2,222,264, 2,448,534, and 3,320,069), ammonia, thioether compounds (described in U.S. Pat. Nos. 3,271,157, 3,574,628, 3,704,130, 4,297,439, and 4,276,345), thione compounds (described in JP-A-53-144319, 53-82408, and 55-77737), amine compounds (described in JP-A-54-100717), thiourea derivatives (described in JP-A-55-2982), imidazoles (described in JP-A-54-100717), and substituted mercaptotetrazoles (described in JP-A-57-202531).

According to the process of this invention, the supplying rates of silver ions and halide ions to the mixer can be desirably controlled. The supplying rates may be constant, but it is preferred to gradually increase the supplying rates. Such methods are described in JP-B-48-36890 and U.S. Pat. No. 3,672,900.

Furthermore, according to the process of this invention, the halogen composition during the crystal growth can be desirably controlled. For example, in the case of silver iodobromide, it is possible to maintain a definite content of silver iodide, continuously increase the content of silver iodide, continuously decrease the content, or change the content of silver iodide after a certain time.

The reaction temperature in the mixer is not higher than 60° C., preferably not higher than 50° C., and more preferably not higher than 40° C.

With a reaction temperature of lower than about 35° C., ordinary gelatin is liable to coagulate and it is preferred to use a low molecular weight gelatin (mean molecular weight of less than about 30,000).

Such a low molecular weight gelatin, which is preferably used in this invention, can usually be prepared as follows. Ordinary gelatin having a mean molecular weight of about 100,000 is dissolved in water and then the gelatin molecule is enzyme-decomposed by adding thereto a gelatin decomposing enzyme. For the method, the description of R. J. Cox, *Photographic Gelatin II*, pages 233–251 and 335–346, Academic Press, London 1976 can be referred to.

In this case, since the bonding position of gelatin decomposed by the enzyme occurs at a specific structural position, low molecular weight gelatin having a relatively narrow molecular weight distribution is obtained. In this case, as the enzyme decomposition time is longer, a lower molecular weight of gelatin is obtained.

In another method of obtaining low molecular weight gelatin, gelatin is hydrolyzed by heating at low pH (e.g., pH 1 to 3) or high pH (e.g., pH 10 to 12).

The temperature of the protective colloid in the vessel is higher than about 40° C., preferably higher than 50° C., and more preferably higher than about 60° C.

In the process of this invention, an aqueous silver salt solution and an aqueous halide solution are not added to the reaction vessel during the nucleus formation and the crystal growth, but prior to the nucleus formation, an aqueous halide solution or an aqueous silver salt solution can be added to the reaction vessel for controlling pAg of the solution in the reaction vessel. Also, an aqueous halide solution or an aqueous silver salt solution can be added (temporarily or continuously) to the reaction vessel for controlling pAg of the solution in the reaction vessel during the formation of nuclei. Also, if necessary, an aqueous halide solution or an aqueous silver salt solution can be added to the reaction vessel by a so-called pAg control double jet method for keeping constant pAg of the solution in the reaction vessel.

The process of this invention is very effective for the production of various kinds of emulsions.

In the nucleus formation and the grain growth of mixed crystal silver halide grains such as silver iodobromide, silver iodobromo-chloride, silver iodochloride, and silver chlorobromide, a microscopic heterogeneity of a halide composition is formed in the case of conventional production processes. Further, the occurrence of such a heterogeneity cannot be avoided even by a production process for obtaining, for example, a uniform halide distribution, that is, even by performing the nucleus formation by adding an aqueous halide solution having a constant halide composition and an aqueous silver salt solution to the reaction vessel. The microscopic heterogeneous distribution of halide can be easily confirmed by observing the transmitted images of the silver halide grains using a transmission type electron microscope.

In this case, the higher the acceleration voltage of the electron microscope is, a clearer transmitted image is obtained, but it is preferred that the voltage be about 200Kvolts up to a thickness of the silver halide grains of about 0.25 μm and be about 1,000Kvolts up to a thickness of thicker than 0.25 μm. Since the higher the acceleration voltage is, the greater the damage to the grains by the irradiated electron rays will be, it is preferred that the sample being observed is cooled by liquid helium as opposed to liquid nitrogen.

The photographing magnification can be properly changed by the grain sizes of the sample being observed, but is usually from 20,000 to 40,000 magnifications.

In silver halide grains composed of a simple halide, there cannot be, as a matter of course, a heterogeneity in the halide distribution and hence only flat images are obtained in a transmission type electron microphotograph. On the other hand, in the case of mixed crystals composed of plural halides, a very fine annular ring-form striped pattern is observed. The distance between the stripes of the pattern is very fine, e.g., along the order of 100 Å or lower, but it can be seen that the pattern shows a very microscopic heterogeneity.

It can be clarified by various methods that the very fine striped pattern shows the heterogeneity of a halide distribution, but in a direct method, it can be concluded that when the grains are annealed under the condition capable of moving iodide ions in the silver halide crystal (e.g., for 3 hours at 250° C.), the striped pattern completely vanishes. These methods are described in Japanese Patent Applications 63-7851, 63-7852, and 63-7853. These inventions relate to a grain growth, but the same effect is also shown in a nucleus formation by the process of the present invention.

The silver iodide content in the silver iodobromide phase or the silver iodochloride phase contained in the silver halide grains produced by the process of the invention is from 2 to 45 mol %, and preferably from 5 to 35 mol %. The total silver iodide content is more than about 2 mol %, preferably more than about 5 mol %, more preferably more than 7 mol %, and particularly preferably more than about 12 mol %.

The process of this invention is useful in the production of silver chlorobromide grains, and silver chlorobromide grains having a completely homogeneous distribution of silver bromide (silver chloride) can be obtained. In this case, the content of silver chloride is more than about 10 mol %, and preferably more than about 20 mol %.

Furthermore, the process of this invention is also very effective in the production of pure silver bromide or pure silver chloride. According to a conventional production process, the presence of a local variation of silver ions and halogen ions in a reaction vessel is unavoidable, the silver halide grains in the reaction vessel are brought into a different circumstance with respect to other portions by passing through such a locally heterogeneous portion. Hence, not only the heterogeneity of the grain growth occurs, but also reduced silver or fogged silver is formed in, for example, a highly concentrated portion of silver ions. Accordingly, in silver bromide or silver chloride, the occurrence of the heterogeneous distribution of the halide cannot take place, but another form of heterogeneity, as described above, occurs.

This problem can be completely solved by the process of this invention.

The silver halide nucleus grains obtained by the process of this invention further grow into silver halide grains having desired grain sizes and a desired halide composition by performing a grain growth thereafter.

When the silver halide grown is, in particular, mixed crystals such as silver iodobromide, silver iodobromochloride, silver chlorobromide, or silver iodo-chloride, it is preferred to perform the grain growth by the process of this invention after the formation of the nuclei.

Also, if necessary, it is preferred to perform the grain growth by adding a previously prepared fine grain silver halide emulsion to the reaction vessel. The details of the process are described in Japanese Patent Applications 63-7851, 63-7852, and 63-7853.

The silver halide grains thus obtained by the process of this invention have the "completely homogeneous" halide distribution in both the nuclei and grown phases of the grains and also the grain size variation thereof is very small.

There is no particular restriction on the mean grain size of the completely homogeneous silver halide grains obtained by the process of this invention, but the mean grain size is preferably at least 0.3 μm, more preferably at least 0.8 μm, and particularly preferably at least 1.4 μm.

The silver halide grains obtained by the process of this invention may have a regular crystal form (normal crystal grains) such as hexahedral, octahedral, dodecahedral, tetradecahedral, tetracosahedral, and octacontahedral, an irregular crystal form such as spherical and potato-form, or various forms having at least one twin plane, in particular, hexagonal tabular twin grains or triangular tabular twin grains having two or three parallel twin planes.

The silver halide photographic emulsion obtained by the process of this invention can be used for various silver halide photographic materials and various additives, the photographic processing process thereof, etc., are described in JP-A-63-123042, 63-106745, 63-106749, 63-100445, 63-71838, 63-85547, *Research Disclosure*, Vol. 176, No. 17643 and *ibid.*, Vol. 187, No. 18716.

The particular portions of the *Research Disclosures* (*RD*) are shown in the following table.

| Additive | RD 17643 | RD 18716 |
|---|---|---|
| 1. Chemical Sensitizer | p. 23 | p. 648, right column |
| 2. Sensitivity Increasing Agent | | " |
| 3. Spectral Sensitizer, Super Color Sensitizer | pp. 23-24 | p. 648, right column– p. 649 right column |
| 4. Whitening Agent | p. 24 | |
| 5. Antifoggant and Stabilizer | pp. 24-25 | p. 649, right column |
| 6. Light Absorber, Filter Dye, Ultraviolet Absorber | pp. 25-26 | p. 649, right column–p. 650, left column |
| 7. Stain Inhibitor | p. 25, right col. | p. 650, left to right columns |
| 8. Dye Image Stabilizer | p. 25 | |
| 9. Hardening Agent | p. 26 | p. 651, left column |
| 10. Binder | p. 26 | " |
| 11. Plasticizer, Lubricant | p. 27 | p. 650, right column |
| 12. Coating Aid, Surface Active Agent | pp. 26-27 | p. 650, right column |
| 13. Antistatic Agent | p. 27 | p. 650, right column |
| 14. Color Coupler | p. 28 | pp. 647-648 |

The invention is further explained practically by the following example.

In the following tests, silver halide fine grains were formed by adding an aqueous solution of 1.2M of silver nitrate and an aqueous solution of 1.2M potassium bromide containing 0.1M of potassium iodide to 2 liters of an aqueous solution of 2% by weight gelatin for 5 minutes.

COMPARISON EXAMPLE 1

Silver halide fine grains were formed by adding the aqueous silver nitrate solution and the aqueous potassium bromide solution (containing potassium iodide) described above to the aforesaid aqueous gelatin solution contained in a reaction vessel using the reaction apparatus as described in JP-B-55-10545.

EXAMPLE 1

In the system of adding an aqueous 2% by weight gelatin solution from the mixer described above in regard to this invention to a reaction vessel at a rate of 250 ml/min., an aqueous solution of 1.2M of silver nitrate and an aqueous solution of 1.2M of potassium bromide (containing potassium iodide) were each added to the mixer at a flow rate of 60 ml/min. for 5 minutes while rotating the stirring blade at 4,000 r.p.m. to form silver halide fine grains. Also, when the amount of the aqueous gelatin solution in the reaction vessel became 2 liters as that in Comparison Example 1, the addition of the aforesaid aqueous solutions was stopped.

For comparing the fine grain sizes of these silver halide fine grains thus obtained, the silver halide grains were sampled after the end of the addition of the aqueous silver nitrate solution and the aqueous potassium bromide solution and the grain sizes were compared by an electron microscope. The results are shown in Table 1.

TABLE 1

| Sample | Mean Grain Size (μm) |
| --- | --- |
| Comparison Example 1 | 0.29 |
| Example 1 | 0.02 |

Then, it was intended to perform the test for growing the silver halide grains by further adding the aqueous silver salt solution and the aqueous potassium bromide solution to the silver halide grains, but since the grain sizes becoming the nuclei differs, physical ripening was halted for a while, the condition for increasing the grain sizes of the silver halide grains obtained in the comparison example and the example to 0.42 μm was investigated beforehand, the silver halide grains were samples from each test liquid, and the grain sizes and the grain size distribution were compared. The results obtained are shown in Table 2.

TABLE 2

| Sample | Mean Grain Size (μm) | Grain Size Distribution (μm) |
| --- | --- | --- |
| Comparison Example 1 | 0.424 | ±0.26 |
| Example 1 | 0.421 | ±0.08 |

Then, the crystal growth of the aforesaid grains by adding an aqueous solution of 1M of silver nitrate and an aqueous solution of 1M potassium bromide each at a rate of 30 ml/min. over a period of 30 minutes by the conventional process in the case of the sample in Comparison Example 1 and by the process of this invention in the case of the sample in Example 1. The results obtained are shown in Table 3.

TABLE 3

| Sample | Mean Grain Size (μm) | Grain Size Distribution (μm) |
| --- | --- | --- |
| Comparison Example 1 | 1.74 | ±0.34 |

TABLE 3-continued

| Sample | Mean Grain Size (μm) | Grain Size Distribution (μm) |
| --- | --- | --- |
| Example 1 | 1.72 | ±0.11 |

As is clear from the aforesaid descriptions, according to the process of this invention for forming silver halide grains, the following excellent effects are obtained.

(1) Silver halide grains having a completely homogeneous halogen distribution are obtained as compared with silver halide grains formed by conventional processes.

(2) The formation of fog on the silver halide grains formed is reduced.

(3) Silver halide grains excellent in sensitivity, gradation, graininess, sharpness, storage stability, and pressure resistance are obtained.

What is claimed is:

1. A process of forming silver halide grains comprising the steps of:
   disposing a mixer outside of a reaction vessel for causing a nucleus formation and a crystal growth of silver halide grains, said mixer including a rotatable stirring blade;
   supplying an aqueous solution of a water-soluble silver salt, an aqueous solution of a water-soluble halide, and an aqueous solution of a protective colloid to the mixer at various flow rates, followed by a mixing step to form fine, silver halide grains; and
   immediately supplying the fine grains to the reaction vessel to perform the nucleus formation and the crystal growth of silver halide grains in the reaction vessel, wherein the formation of said silver halide fine grains is controlled by controlling the flow rates of the aqueous solutions being added to the mixer and the rotational speed of said stirring blade in the mixer, wherein the aqueous protective colloid solution has a concentration of at least 0.5% by weight, and a flow rate of at least 100% of the sum of the flow rate of the aqueous silver nitrate solution and the flow rate of the aqueous halide solution being supplied to the mixer.

2. A process of forming silver halide grains comprising the steps of:
   disposing a mixer outside of a reaction vessel for causing a nucleus formation and a crystal growth of silver halide grains, said mixer including a rotatable stirring blade;
   supplying an aqueous solution of a water-soluble silver salt, an aqueous solution of a water-soluble halide, and an aqueous solution of a protective colloid to the mixer at various flow rates, followed by a mixing step to form fine, silver halide grains; and
   immediately supplying the fine grains to the reaction vessel to perform the nucleus formation and the crystal growth of silver halide grains in the reaction vessel, wherein the formation of said silver halide fine grains is controlled by controlling the flow rates of the aqueous solutions being added to the mixer and the rotational speed of said stirring blade in the mixer, wherein said supplying step includes adding an amount a of said aqueous solution of the water-soluble silver salt which is silver nitrate, adding an amount b of said aqueous solution of the water-soluble halide, and adding an amount c of said aqueous solution of the protective colloid; further comprising:
   controlling a flow rate of the sum of said addition amounts a, b, c while keeping the ratio of each solution with respect to the other at a constant value.

* * * * *